United States Patent [19]

Kishi et al.

[11] Patent Number: 4,745,558
[45] Date of Patent: May 17, 1988

[54] ISLAND CUTTING METHOD

[75] Inventors: Hajimu Kishi; Masaki Seki; Takashi Takegahara, all of Tokyo, Japan

[73] Assignee: Fanuc Ltd., Minamitsuru, Japan

[21] Appl. No.: 767,265

[22] PCT Filed: Dec. 14, 1984

[86] PCT No.: PCT/JP84/00593
§ 371 Date: Aug. 13, 1985
§ 102(e) Date: Aug. 13, 1985

[87] PCT Pub. No.: WO85/02573
PCT Pub. Date: Jun. 20, 1985

[30] Foreign Application Priority Data

Dec. 14, 1983 [JP] Japan .................. 58-235462

[51] Int. Cl.$^4$ .............................................. G05B 9/00
[52] U.S. Cl. .................................................. 364/474
[58] Field of Search ............... 364/167, 168, 169, 170, 364/474, 475; 318/572, 568, 569

[56] References Cited

U.S. PATENT DOCUMENTS

4,618,924 10/1986 Hinds .................. 364/191

Primary Examiner—Jerry Smith
Assistant Examiner—Allen MacDonald
Attorney, Agent, or Firm—Staas & Halsey

[57] ABSTRACT

The present invention relates to an area cutting method for cutting an area (AR) delimited by a curve (OLC) of an external shape and a plurality of closed curves ($INC_1$, $INC_2$) using a unidirectional cutting method or a back-and-forth cutting method. The area cutting method has a step of calculating first and second offset curves ($INF_1$, $INF_2$) obtained by outwardly offsetting respective closed curves by an amount dependent upon tool diameter, a step of calculating points of intersection ($R_i$-$U_i$) between each of the offset curves and an i-th cutting path ($PT_i$), a step of moving a tool (TL), while the tool performs cutting, along the cutting path from a machining starting point ($P_i$) on the i-th cutting path ($PT_i$), to a first point of intersection ($R_i$), of the two points of intersection ($R_i$, $S_i$) between the cutting path and the first offset curve ($INF_1$), a step, executed in a case where a second point of intersection ($R_i$) between the first offset curve and the cutting path lies inside the second offset curve ($INF_2$), of moving the tool, without the tool performing cutting, from the first point of intersection ($R_i$) to that point of intersection ($U_i$) of two points of intersection ($T_i$, $U_i$) between the second offset curve and the cutting path which does not lie inside the first offset curve, and a step of moving the tool, while the tool performs cutting, along the cutting path up to a machining end point ($Q_i$).

8 Claims, 7 Drawing Sheets

ISLAND CUTTING METHOD

CROSS REFERENCES TO RELATED APPLICATIONS

This application is related to U.S. applications having Ser. Nos. 767,797; 776,205 and 768,118.

BACKGROUND OF THE INVENTION

1. Field of the Invention

This invention relates to an area cutting method in a numerically controlled machine tool and, more particlarly, to an area cutting method for cutting an area delimited by a curve of an external shape and at least two closed curves which lie within the curve of the external shape.

2. Description of The Related Art

Forms of numerically controlled machining include cutting in which the interior of an area bonded by the curve of an external shape comprising straight lines and circular arcs is hollowed out down to a predetermined depth, and die milling in which the interior of an area is die milled. In such machining, as shown in FIG. 1(A), an area cutting method is conventionally carried out by performing cutting along an (i−1)th cutting path $PT_{i-1}$ in one direction (the direction of the solid-line arrow), raising the tool a predetermined amount at the completion of cutting, then positioning the tool directly above a cutting starting point Ps on the next, or i-th, cutting path $PT_i$ by moving the tool in the direction of the dashed-line arrow, thereafter lowering the tool to the cutting starting point Ps, moving the tool along the i-th cutting path $PT_i$ in the direction of the solid line arrow, and subsequently repeating the above unidirectional cutting.

Figure 1A:
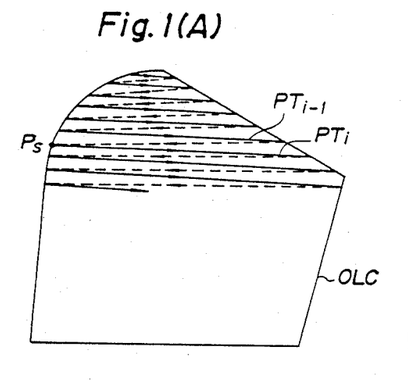
FIGS. 1(A), 1(B) are views for describing conventional area cutting methods using unidirectional and back-and-forth cutting.
Figure 1B:
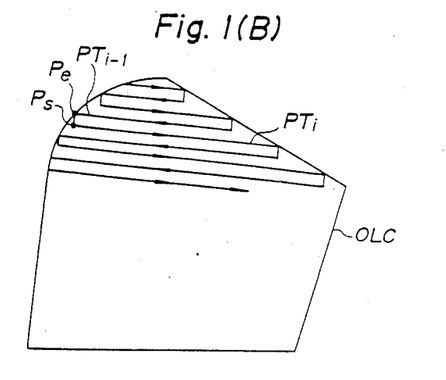

Another area cutting method shown in FIG. 1(B) includes, following completion of cutting along the cutting path $PT_{i-1}$ of the (i−1)th cutting path, moving the tool from a cutting end point Pe to the cutting starting point Ps on the next, or i-th, cutting path, and thereafter performing cutting along the i-th cutting path $PT_i$. Thus, cutting is performed back and forth in the direction of the solid-line arrows.

Figures 2, 3:
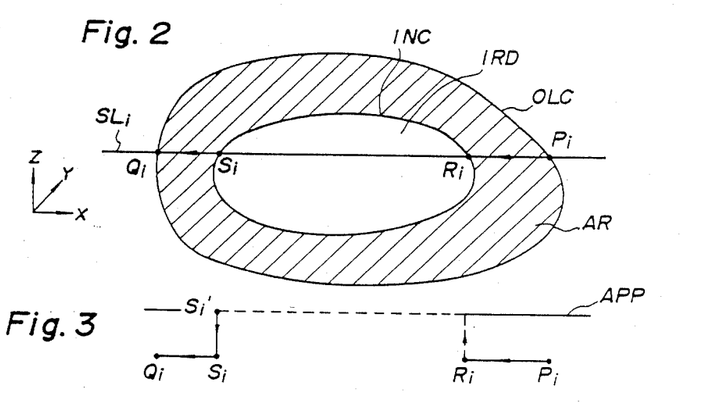
FIGS. 2 and 3 are views for describing a conventional cutting method for a case where an island is present.

There are cases where it is required to cut an area AR (shaded portion) delimited by a curve OLC of an external shape and a closed curve INC inside the curve of the external shape, as shown in FIG. 2. The reason is that it is necessary to form bolt holes, which are needed for effecting a connection to another part, in the area (hereafter referred to as an "island") IRD bounded by the closed curve INC, or to hollow out the island IRD to a depth less than that of the area AR by using a different tool.

Thus, if the island IRD is present inside the curve of the external shape, the area AR (the shaded portion in FIG. 2) delimited by the shape OLC of the external curve and the closed curve INC is cut, in accordance with the conventional method shown in FIG. 1(A) or 1(B), by (a) obtaining intersection points $P_i$, $Q_i$ between a straight line $SL_i$ and the curve OLC (actually an offset curve) of the external shape, and obtaining intersection points $R_i$, $S_i$ between the straight line $SL_i$ and the closed curve INC (actually an offset curve), (b) then moving the tool in a cutting-feed mode from the point $P_i$ to the point $R_i$ after positioning the tool at the point $P_i$, which is a cutting starting point, (c) raising the tool along the +Z axis up to an approach plane APP (FIG. 3) after the tool arrives at the point $R_i$, (d) moving the tool in a rapid-traverse mode on the approach plane APP, after the tool has arrived at the approach plane APP, at a point $S_i'$ directly above the point $S_i$, (e) then lowering the tool in the cutting-feed mode to the point $S_i$, (f) thereafter moving the tool in the cutting-feed mode from the point $S_i$ to the point $Q_i$, and (g) subsequently repeating steps (a) through (f) for the next cutting path.

Figure 4:
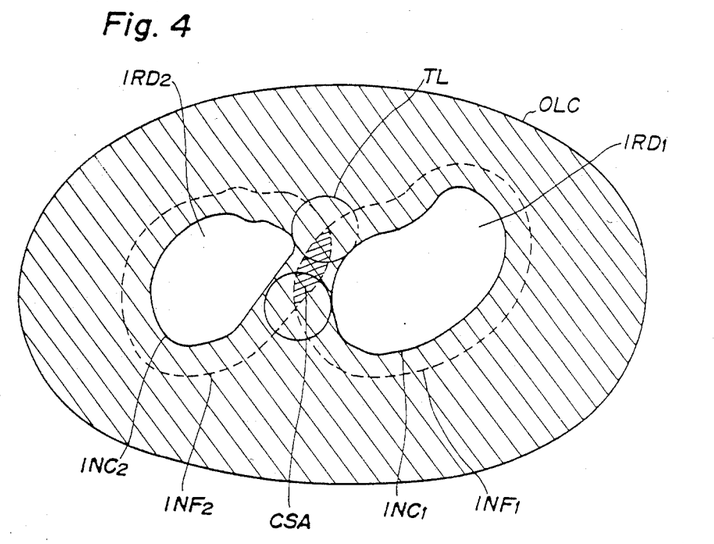
FIG. 4 is a view for describing the drawback of the conventional area cutting methods.

Area cutting can thus be carried out with the conventional methods even if the island IRD is present. However, the conventional methods cannot be applied if two or more islands are present and the spacing between the islands is small. By way of example, the conventional methods cannot be applied if, as shown in FIG. 4, two islands $IRD_1$, $IRD_2$ reside so close together inside the curve OLC of the external shape that offset curves $INF_1$, $INF_2$ intersect. The latter curves being obtained by offsetting closed curves $INC_1$, $INC_2$, which specify the respective islands, by a predetermined amount D (e.g., a value obtained by adding tool radius $r_a$ and finishing tolerance t). If the conventional methods are forced into use in this case, the tool TL will unfortunately cut into either island $IRD_1$ or island $IRD_2$ in the vicinity of the intersection CSA.

SUMMARY OF THE INVENTION

Accordingly, an object of the present invention is to provide an area cutting method wherein, even if two or more islands reside so close together inside the curve OLC of the external shape that the offset curves $INF_1$, $INF_2$ of the respective closed curves $INC_1$, $INC_2$ specifying the islands intersect each other to give rise to a portion which is impossible to area-cut, a remaining area-cuttable portion, from which the abovementioned portion is omitted, is capable of being area-cut.

The present invention relates to an area cutting method for cutting an area delimited by a curve of an external shape and a plurality of closed curves using a unidirectional cutting method or a back-and-forth cutting method. The area cutting method has a step of calculating first and second offset curves obtained by outwardly offsetting each of the closed curves (assumed to be two in number) by an amount dependent upon tool diameter, a step of calculating points of intersection between each of the offset curves and an i-th cutting path, a step of moving a tool, while the tool performs cutting, along the cutting path from a machining starting point on the i-th cutting path to a first point of intersection of two points of intersection between the cutting path and the first offset curve, a step, executed in a case where a second point of intersection between the first offset curve and the cutting path lies inside the second offset curve, of moving the tool, without the tool performing cutting, from the first point of intersection to that point of intersection of two points of intersection between the second offset curve and the cutting path which does not lie inside the first offset curve, and a step of thereafter moving the tool, while the tool performs cutting, along the cutting path up to a machining end point, whereby an area delimited by the first and second offset curves is not cut.

In a case where the second point of intersection of the two points of intersection between the first offset curve and the cutting path does not lie inside the second offset curve, the tool is moved, without performing cutting, from the first point of intersection to the second point of intersection, the tool is then moved while performing cutting along the cutting path from the second point of intersection to one of the points of intersection between the cutting path and the second offset curve, the tool is then moved, without performing cutting, from said point of intersection to the other point of intersection between the cutting path and the second offset curve, and the tool is subsequently moved while performing machining along the cutting path up to the machining end point.

DESCRIPTION OF THE PREFERRED EMBODIMENTS

Figure 5:
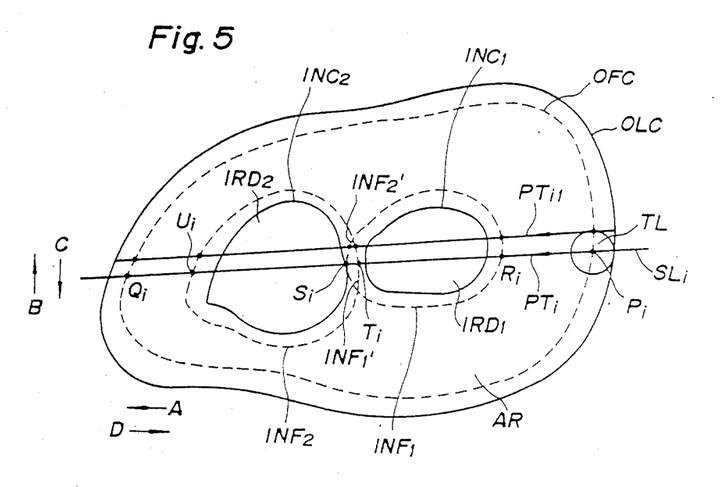
FIG. 5 is a view for describing the present invention in general terms.

FIG. 5 is a view for describing the present invention in general terms. The present invention provides an area cutting method for cutting an area AR delimited by a curve OFC of an external shape and at least two closed curves $INC_1$, $INC_2$ while lie within the curve of the external shape by moving a tool TL relative to a workpiece along a cutting path $PT_i$ to perform cutting, moving the tool to a machining starting point on the next cutting path $PT_{i+1}$, which is shifted from the cutting path $PT_i$ by a predetermined amount, after the completion of cutting along the cutting path $PT_i$, and thereafter moving the tool relative to the workpiece along the next cutting path $PT_{i+1}$ to perform cutting. The area cutting method has a step of calculating an offset curve OFC of an external shape obtained by inwardly offsetting a curve OLC of an external shape by an amount dependent upon tool diameter, as well as first and second offset curves $INF_1$, $INF_2$ obtained by outwardly offsetting respective closed curves $INC_1$, $INC_2$ by an amount dependent upon tool diameter, a step of calculating points of intersection $P_iU_i$ between each of the offset curves OFC, $INF_1$, $INF_2$ and an i-th cutting path $PT_i$, a step of moving a tool, while the tool performs cutting, along the cutting path from a machining starting point $P_i$, which is the point of intersection between the offset curve OFC of the external shape and the cutting path $PT_i$, to one point of intersection $R_i$ between the cutting path and the first offset curve $INF_1$, a step, executed in a case where the other point of intersections $S_i$ between the first offset curve and the cutting path lies inside the second offset curve $INF_2$, of moving the tool, without the tool performing cutting, from the point of intersection $R_i$ to that point of intersection $U_i$ of two points of intersection between the second offset curve $INF_2$ and the cutting path $PT_i$ which does not lie inside the first offset curve $INF_1$, and a step of moving the tool, while the tool performs cutting, along the cutting path up to a machining end point $Q_i$, which is the other point of intersection between the offset curve OFC of the external shape and the cutting path.

Figure 6:
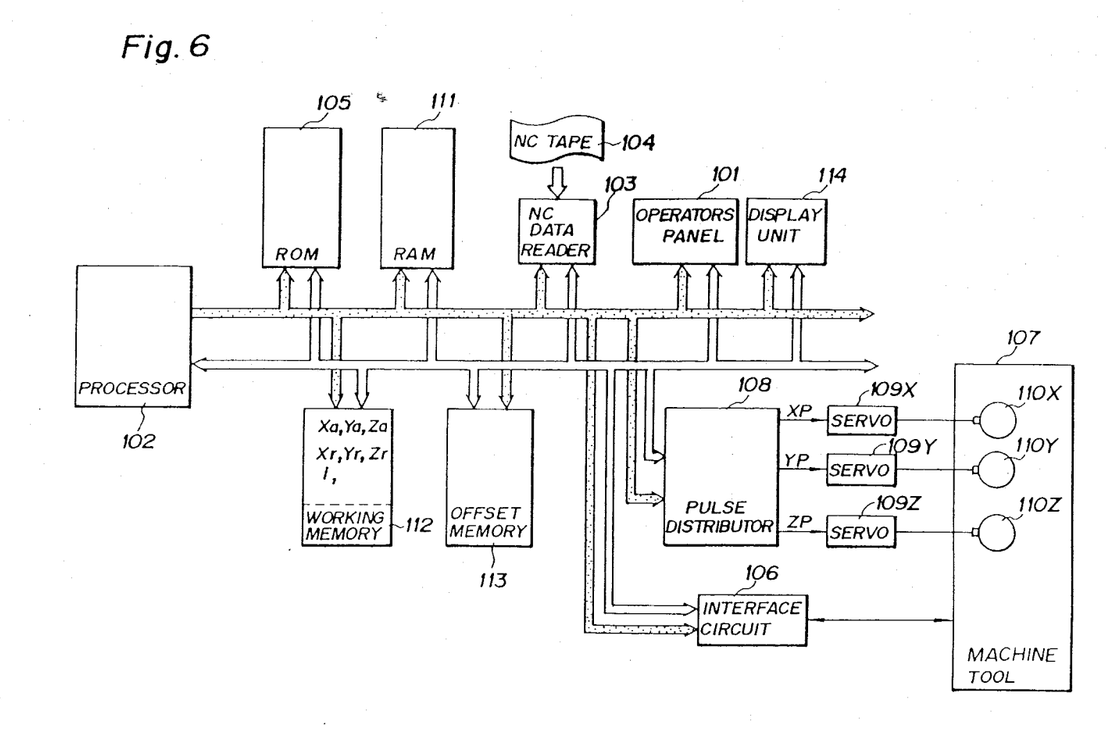
FIG. 6 is a block diagram of an apparatus for practicing the area cutting method of the present invention.
Figure 7A:
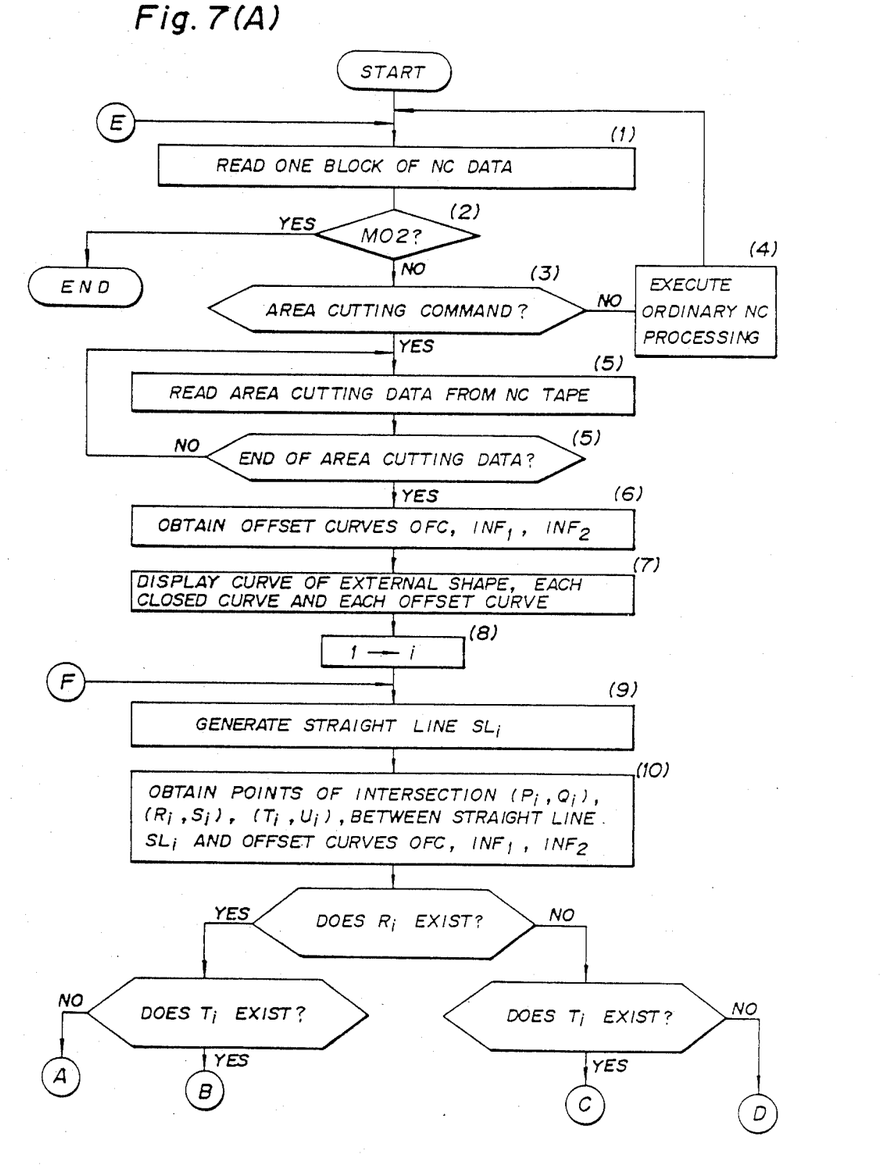
FIGS. 7A & 7B are flowcharts of processing for implementing the area cutting method of the present invention.
Figure 7B:
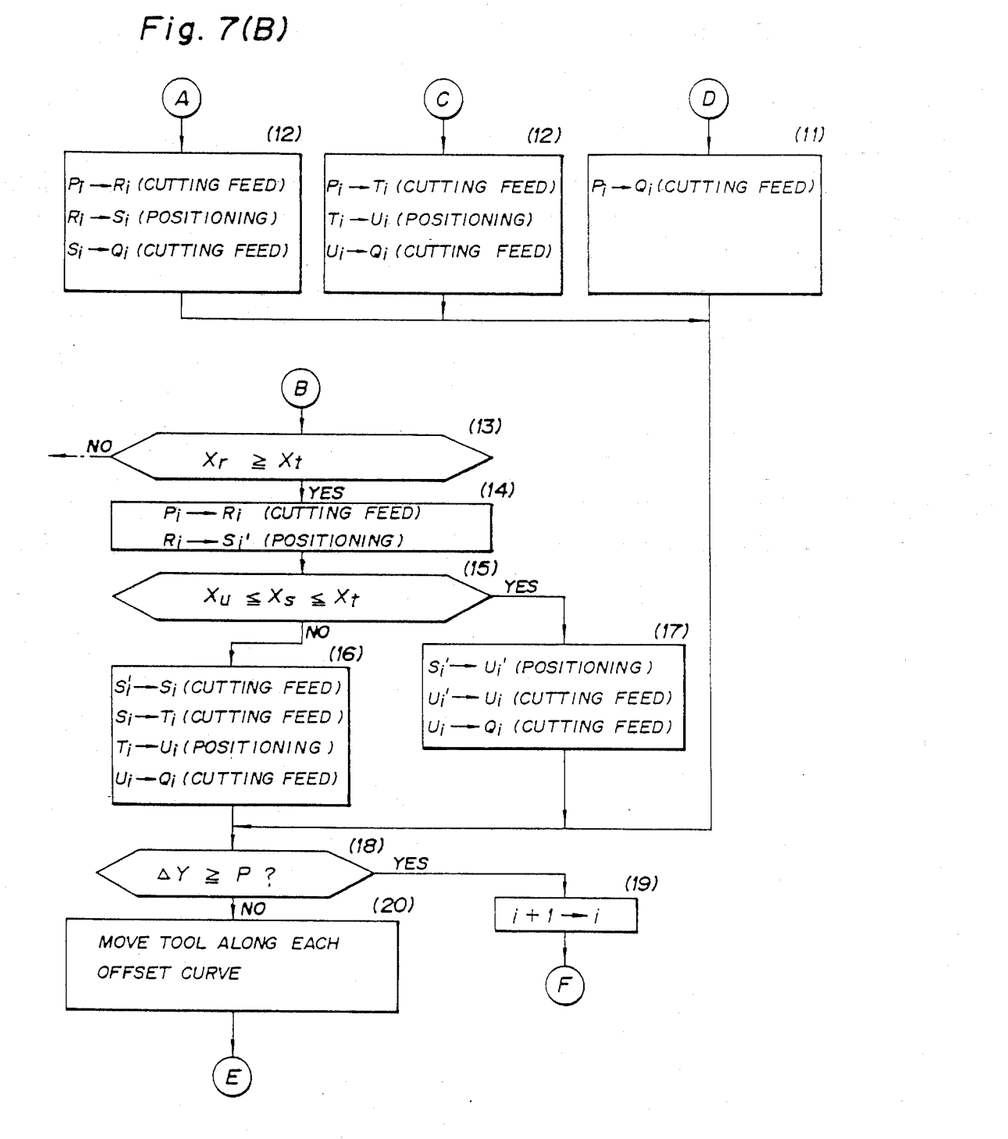

FIG. 6 is a block diagram of an apparatus for practicing the method of the present invention, and FIG. 7 is a flowchart of processing according to the present invention. The area cutting method of the present invention will now be described with respect to FIGS. 5, 6 and 7.

(1) When a cycle start button on an operator's panel 101 is pressed, a processor 102 causes an NC data reader 103 to read one block of NC data from an NC tape 104. The NC tape 104 stores area cutting data in addition to ordinary path data, G-function instruction data and M-, S- and T-function instruction data. Stored at the end of the NC program is an M code (M02) indicating the end of the program. Placed at the beginning of the area cutting data is an area cutting command indicating that the data which follow are the area cutting data. Placed at the end of the area cutting data is a code indicative of the end of the area cutting data.

(2) The processor 102, placed under the control of a control program stored in a ROM 105, checks whether an item of the read NC data is "M02", which is indicative of the program end. If the item of data is "M02", numerical control processing is ended.

(3) If the item of read NC data is not "M02" indicative of the program end, then the processor 102 checks whether the item of NC data is the area machining command.

(4) If the item of NC data is not the area machining command, the processor 102 executes ordinary numerical control processing.

By way of example, if an item of NC data is an M-, S- or T-function instruction, the processor delivers the data to a machine tool 107 via an interface circuit 106 between an NC unit and the machine. When the machine tool 107 generates a completion signal indicating completion of processing for the M-, S- or T-function instruction, the processor causes the NC data reader 103 to read the next item of NC data.

If the item of NC data is path data, then the following path control processing is executed. Specifically, the processor obtains incremental values $X_i$, $Y_i$, $Z_i$ along the respective axes, obtains velocity components $F_x$, $F_y$, $F_z$ along the respective axes from equations $$F_x = X_i \cdot F / \sqrt{X_i^2 + Y_i^2 + Z_i^2} \quad (1a)$$

$$F_y = Y_i \cdot F / \sqrt{X_i^2 + Y_i^2 + Z_i^2} \quad (1b)$$

$$F_z = Z_i \cdot F / \sqrt{X_i^2 + Y_i^2 + Z_i^2} \quad (1c)$$

based on the incremental values and a commanded feed velocity F, thereafter obtains traveling quantities $\Delta X$, $\Delta Y$, $\Delta Z$, which are to be traversed along the respective axes in a predetermined period of time $\Delta T$ seconds (=8 msec), from equations $$\Delta X = F_x \cdot \Delta T \quad (2a)$$

$$\Delta Y = F_y \cdot \Delta T \quad (2b)$$

$$\Delta Z = F_z \cdot \Delta T \quad (2c)$$

The processor delivers $\Delta X$, $\Delta Y$, $\Delta Z$ to a pulse distributor 108 every $\Delta T$ sec. On the basis of the input data ($\Delta X$, $\Delta Y$, $\Delta Z$), the pulse distributor 108 performs a simultaneous three-axis pulse distribution calculation to generate distributed pulses $X_p$, $Y_p$, $Z_p$. The distributed pulses are applied as inputs to servo circuits 109X, 109Y, 109Z for the respective axes to rotate servomotors 110X, 110Y, 110Z. The tool is thus moved relative to the workpiece toward a target position.

The processor 102, in accordance with the following formulae, updates the present position $X_a$, $Y_a$ $Z_a$ along the respective axes every $\Delta T$ sec, $X_a$, $Y_a$, $Z_a$ having been stored in a working memory 112:

$$X_a \pm \Delta X \rightarrow X_a \quad (3a)$$

$$Y_a \pm \Delta Y \rightarrow Y_a \quad (3b)$$

$$Z_a \pm \Delta Z \rightarrow Z_a \quad (3c)$$

The sign depends upon the direction of movement. Similarly, in accordance with the following formulae, the processor 102 updates remaining traveling distances $X_r$, $Y_r$, $Z_r$ (the initial values of which are the incremental values $X_i$, $Y_i$, $Z_i$, respectively) every $\Delta T$ sec, $X_r$, $Y_r$, $Z_r$ having been stored in the working memory 112:

$$X_r - \Delta X \rightarrow X_r \quad (4a)$$

$$Y_r - \Delta Y \rightarrow Y_r \quad (4b)$$

$$Z_r - \Delta Z \rightarrow Z_r \quad (4c)$$

When the following condition is established:

$$X_r = Y_r = Z_r = 0 \quad (5)$$

the processor 102 then causes the NC data reader 103 to read the next item of NC data.

(5) If the item of NC data is found to be the area cutting command at the decision step (3), the processor 102 causes the NC data reader 103 to read the area cutting data and store the data in a RAM 111 until the code indicating the end of the area cutting data is read out. It should be noted that the area cutting data are (1) data specifying the curve OLC of the external shape of the area, (2) data specifying the two closed curves $INC_1$, $INC_2$ inside the curve of the external shape, (3) cutting direction data (data indicating that the tool is to be moved in the direction of the arrow A or in the direction of an arrow D in FIG. 5), (4) cut-in direction data (data indicating that the cutting path is to be shifted in the direction of the arrow B or in the direction of an arrow C in FIG. 5), (5) pitch P in the cut-in direction (the amount of cutting path shift), (6) cutting velocity, (7) coorindate values of a starting point $P_s$ in the cut-in direction, (8) coordinate values of an end point $P_e$ in the cut-in direction, (9) the position of an approach plane, and the like. Hereafter we will assume that the cutting direction is the $+X$ direction, that the cut-in direction is the $+Y$ direction, that the approach plane is parallel to the XY plane at a height $Z_A$, that the coordinate values of the cut-in direction starting point $P_s$ are $(X_s, Y_s)$, and that the coordinate values of the cut-in direction end point $P_e$ are $(X_e, Y_e)$.

Figure 8:
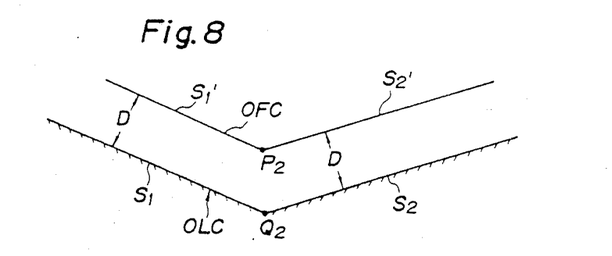
FIG. 8 is a view for describing offset processing.

(6) When the reading of the area cutting data ends, the processor 102 calculates, and stores in the RAM 111, an offset curve OFC of the external shape offset from the curve OLC of the external shape by a distance $D$ ($=r_a+t$), the latter being obtained by adding the tool radius $r_a$ and the finishing tolerance $t$, as well as the first and second offset curves $INF_1$, $INF_2$ offset outwardly from the closed curves $INC_1$, $INC_2$, respectively, by the distance D. It should be noted that $D=r_a$ is permissible. Also, the tool radius $r_a$ is obtained by reading a radius value corresponding to a commanded tool number from an offset memory 113, which stores the correspondence between tool numbers and tool radii. The offset curve OFC of the external shape and the first and second offset curves $INF_1$, $INF_2$ are found through the following processing. Specifically, as shown in FIG. 8, let two straight lines specifying the curve OLC of the external shape be S1 and S2. Straight lines S1', S2' offset from the straight lines S1, S2, respectively, by the distance D are found. The intersection P2 of the straight lines S1', S2' is then found. The intersection P2 is one point specifying the offset curve OFC of the external shape. Accordingly, if points of intersection are found in a similar manner and stored in the RAM 111, the offset curve OFC of the external shape will be obtained. The first and second offset curves $INF_1$, $INF_2$ are found in a similar manner.

(7) When the offset curve OFC of the external shape and the first and second offset curves $INF_1$, $INF_2$ have been found, the processor 102 causes the offset curve data to be displayed on a display unit 114 together with data specifying the curve OLC of the external shape and data specifying the closed curves $INC_1$, $INC_2$. As a result, the curve OLC of the external shape and the closed curves $INC_1$, $INC_2$ are displayed in the form of solid lines, as well as the offset curves in the form of dashed lines, on a CRT screen using a well-known method. By observing the display, an operator is capable of perceiving that a portion which cannot be area-cut exists, this being the case if the offset curves indicated by the dashed lines intersect each other. The operator also perceives that a shape actually cut by subsequent processing may differ slightly from the desired shape.

(8) Next, the processor 102 performs the operation $1 \rightarrow i$.

(9) The processor 102 then executes processing for specifying the k-th cutting path $PT_i$ (see FIG. 5). Specifically, the processor 102 first generates a straight line $SL_i$. Note that the straight line $SL_i$ is expressed by the equation $$y = Y_s + P \cdot i$$

(10) Thereafter, the processor 102 calculates intersection points $P_i$, $Q_i$ where the straight line $SL_i$ intersects the offset curve OFC of the external shape, and obtains intersection points $R_i$, $S_i$ and $T_i$, $U_i$ between the straight line $SL_i$ and the first and second offset curves $INF_1$, $INF_2$, respectively. Of the intersection points $P_i$, $Q_i$, that which has the larger X coordinate value is treated as the machining starting point, and that which has the smaller X coordinate value is treated as the machining end point.

(11) If the intersection points $R_i$, $T_i$ do not exist (in which case the intersection points $S_i$, $U_i$ also will be non-existent as a matter of course), the processor 102 executes the path processing similar to that of step (4) to move the tool in the cutting-feed mode from the machining starting point $P_i$ to the machining end point $Q_i$, thereby performing cutting along the i-th cutting path $PT_i$.

(12) If only one of the intersection points $R_i$, $T_i$ exists (we shall assume that only the point $R_i$ exists), the processor 102 executes the path processing of step (4) to move the tool in the cutting-feed mode from the machining starting point $P_i$ to the point $R_i$, raises the tool along the +Z axis in the rapid-traverse mode up to the approach plane after the tool arrives at the point $R_i$, moves the tool on the approach plane in the rapid-traverse mode to a point directly above the point $S_i$ after the tool arrives at the approach plane, then lowers the tool in the cutting-feed mode to the point $S_i$, and thereafter moves the tool in the cutting-feed mode from the point $S_i$ to the machining end point $Q_i$ to perform cutting along the i-th cutting path $PT_i$.

(13) If both of the intersection points $R_i$, $T_i$ exist, the processor 102 compares the values of the X coordinates $x_r$, $x_t$ of the intersection points $R_i$, $T_i$, respectively.

(14) If $x_r \geq x_t$ is true, the processor 102 performs path processing similar to that of step (4) to move the tool in the cutting-feed mode (i.e., while the tool performs cutting) from the machining starting point $P_i$ to the point $R_i$. After arrival at the point $R_i$, the tool is raised up to the approach plane in the rapid-traverse mode along the +Z axis and then, after its arrival at the approach plane, the tool is moved in the rapid-traverse mode along the approach plane to a point $S_i'$ directly above the point $S_i$. Note that if $x_r < x_t$ is true, processing is performed in the same manner as for the case $x_r \geq x_t$ and therefore need not be described here.

(15) Thereafter, or in parallel with the path processing of step (14), the processor 102 determines whether the point $S_i$ lies inside the second offset curve $INF_2$. The decision is based on whether or not the following relation is true:

$$x_u \leq x_s \leq x_t \quad (6)$$

where $x_s$ represents the X coordinate value of the point $S_i$ and $x_t$, $x_u$ stand for the X coordinate values of the points $T_i$, $U_i$, respectively. Specifically, it is decided that the point $S_i$ lies inside the second offset curve $INF_2$ if relation (6) is satisfied and outside the offset curve $INF_2$ if relation (6) is not satisfied.

(16) If point $S_i$ lies outside the second offset curve $INF_2$, the tool is lowered in the cutting-feed mode from point $S_i'$ to point $S_i$, then moved in the cutting-feed mode (i.e., while performing cutting) from the point $S_i$ to the point $T_i$, raised in the rapidtraverse mode along the +Z axis up to the approach plane after arrival at the point $T_i$, moved in the rapid-traverse mode along the approach plane to a point $U_i'$, directly above the point $U_i$ after arrival at the approach plane, lowered in the cutting-feed mode from point $U_i'$ to point $U_i$, and thereafter moved in the cutting-feed mode from point $U_i$ to the machining end point $Q_i$. Thus, cutting is performed along the i-th cutting path $PT_i$.

(17) If the result of the decision at step (15) is that the point $S_i$ lies inside the offset curve $INF_1$, the processor 102 moves the tool in the rapid-traverse mode along the approach plane from the point $S_i'$ to the point $U_i'$ directly above the point $U_i$. The tool is then moved in the cutting-feed mode from the point $U_i$ to the machining end point $Q_i$. Thus, cutting is performed along the i-th cutting path $PT_i$.

(18) When machining along the cutting path PTi ends, the processor 102 obtains the difference $\Delta Y$ ($=Y_e - Y_a$) between the present position coordinate (stored in the working memory 112) $Y_a$ along the Y axis and the Y-axis coordinate $Y_e$ of the cut-in direction end point $P_e$ and determines whether or not the difference is greater than the pitch P.

(19) If $\Delta Y \geq P$ is true, the processor 102 performs the operation $$i+1 \rightarrow i$$

and repeats the processing from step (9) onward.

(20) If $\Delta Y < P$ is true, then the processor 102 moves the tool along each of the offset curves OFC, $INF_1$, $INF_2$ in the cutting-feed mode to machine the uncut portions, thereby ending area cutting. The processor subsequently reads the next item of NC data and repeats the foregoing processing.

Figure 9A:
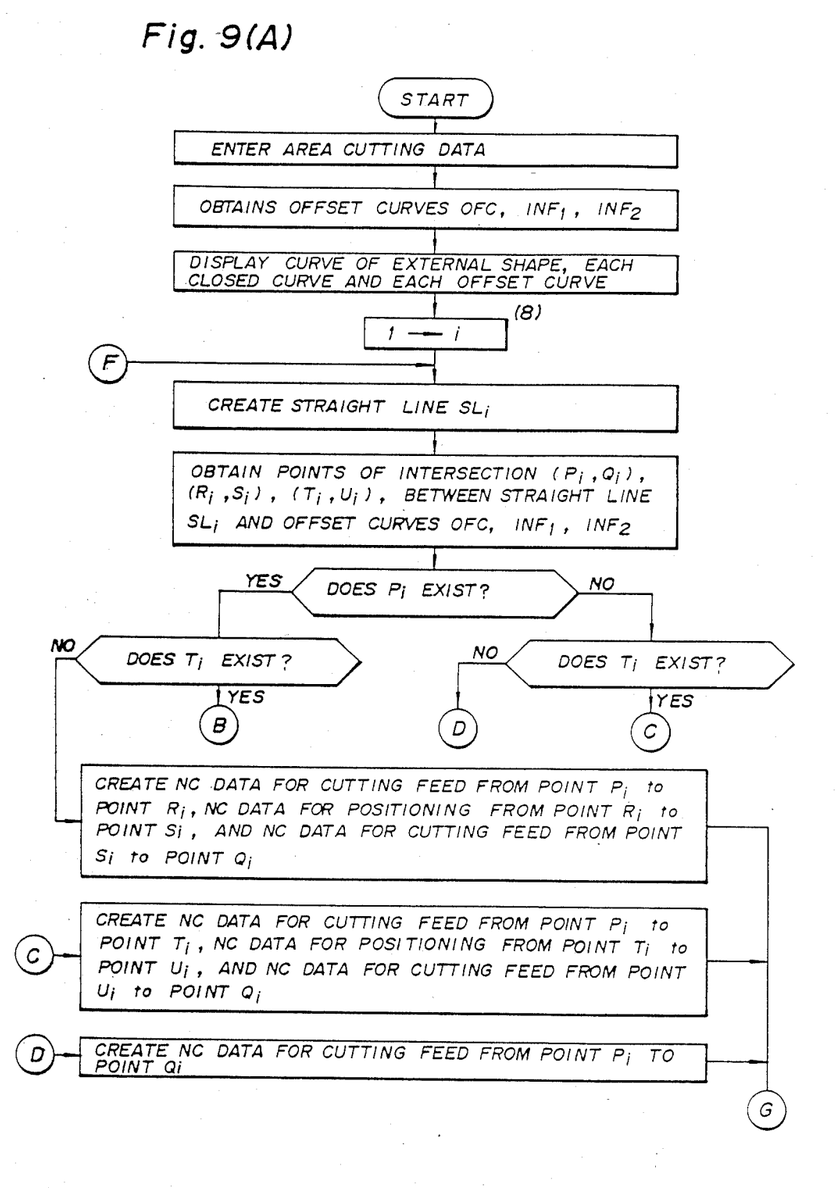
FIGS. 9A & 9B are flowcharts of processing for creating an NC tape for area cutting.
Figure 9B:
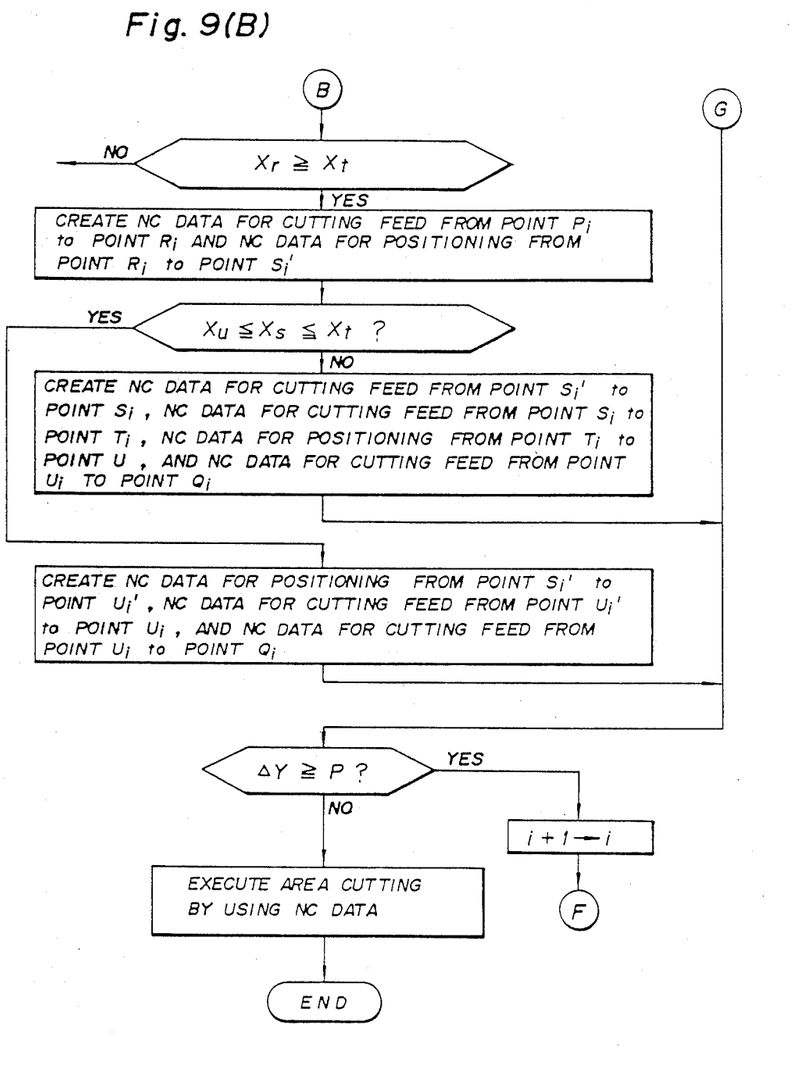

In the case described above, an area cutting command is inserted into an NC tape in advance, cutting paths are generated successively by using the area cutting data that follow the area cutting command, and area cutting is performed by moving a tool along the cutting paths. However, the present invention is not limited to such an arrangement. As an example, an arrangement is possible in which area cutting data are entered, NC data for area cutting are created through a technique similar to that described above using the area cutting data, and area cutting is performed upon feeding the NC data into an NC unit. FIG. 9 is a flowchart of processing for creating NC data for such area cutting. The only difference between this flowchart and that of FIG. 7 is that instead of moving the tool in the cutting-feed mode or positioning the tool in the rapid-traverse mode, NC data for cutting or for positioning are created.

Further, the present invention has been described for a case where the invention is applied to area cutting performed by repeating unidirectional or back-and-forth cutting. However, the invention is not limited to such an arrangement but can be applied to a case where area cutting is performed by obtaining an offset curve offset by a predetermined amount from the curve of an external shape, cutting along the offset curve thereafter obtaining another offset curve offset by a predetermined amount from the above-mentioned offset curve, cutting along this other offset curve and subsequently repeating the foregoing operations.

According to the present invention as described above, even if two or more islands reside so close together inside the curve OLC of the external shape that the offset curves $INF_1$, $INF_2$ of the respective closed curves $INC_1$, $INC_2$ specifying the islands intersect each other to give rise to a portion which is impossible to area-cut, a remaining area-cuttable portion, from which the above-mentioned uncuttable portion is omitted, is capable of being area-cut. Accordingly, the invention is well-suited for application to numerically controlled machining.

What we claim is:

1. An area cutting method for cutting an area delimited by a curve of an external shape and at least two closed curves which lie within said curve of the external shape, comprising the steps of:

moving a tool relative to a workpiece along a first cutting path to perform cutting;

moving the tool to a machining starting point on a second cutting path, which is shifted from said first cutting path by a predetermined amoount, after the completion of cutting along said first cutting path;

moving the tool relative to the workpiece along the second cutting path to peform cutting;

calculating first and second offset curves obtained by outwardly offsetting respective closed curves by an amount dependent upon tool diameter;

moving the tool, while the tool performs cutting, along the second cutting path to a first point of intersection $R_i$ of two points of intersection between said second cutting path and the first offset curve;

checking, after cutting said first cutting path, before moving the tool, without the tool performing cutting, to that point of intersection $U_i$ of two points of intersection $T_i$ and $U_i$ between the second offset curve and the second cutting path which does not lie inside the first offset curve, whether a second point of intersection $S_i$ lies between the two points of intersection $T_i$ and $U_i$ between the second cutting path and the second offset curve to determine whether said second point of intersection lies inside the second offset curve;

moving the tool, without the tool performing cutting, to that point of intersection $U_i$ of two points of intersection $T_i$ and $U_i$ between the second offset curve and the second cutting path which does not lie inside the first offset curve when said second point of intersection $S_i$ between said first offset curve and the second cutting path lies inside the second offset curve; and moving the tool, while the tool performs cutting, along the second cutting path from said point of intersection $U_i$ to a machining end point on the cutting path.

2. An area cutting method according to claim 1, further comprising the steps of:

moving the tool, without the tool performing cutting, from said first point of intersection $R_i$ to said second point of intersection $S_i$ when said second point of intersection $S_i$ does not lie inside the second offset curve;

moving the tool, while the tool performs cutting, along the second cutting path from said second point of intersection $S_i$ to one of the points of intersection $T_i$ between said second cutting path and the second offset curve; and moving the tool, without the tool performing cutting, from said point of intersection $T_i$ to the other point of intersection $U_i$ between the second cutting path and the second offset curve.

3. An area cutting method according to claim 2, further comprising the step of:

checking, before moving the tool, without the tool performing cutting, to that point of intersection $U_i$ of two points of intersection $T_i$ and $U_i$ between the second offset curve and the second cutting path which does not lie inside the first offset curve, whether said second point of intersection $S_i$ lies between the two points of intersection $T_i$ and $U_i$ between the second cutting path and the second offset curve to determine whether said second point of intersection lies inside the second offset curve.

4. An area cutting method for cutting an area delimited by a curve of an external shape and at least two closed curves which lie within said curve of the external shape, comprising the steps of:

moving a tool relative to a workpiece along a first cutting path to perform cutting;

moving the tool to a machining starting point on a second cutting path, which is shifted from the first cutting path by a predetermined amount, after the completion of cutting along the first cutting path;

moving the tool relative to the workpiece along the second cutting path to perform cutting;

calculating first and second offset curves obtained by outwardly offsetting respective closed curves by an amount dependent upon tool diameter;

moving the tool, while the tool performs cutting, along with second cutting path to a first point of intersection $R_i$ of two points of intersection between said second cutting path and the first offset curve;

checking, after cutting along said first cutting path, before moving the tool, without the tool performing cutting, to that point of intersection $U_i$ of two points of intersection $T_i$ and $U_i$ between the second offset curve and the second cutting path which does not lie inside the first offset curve, whether a second point of intersection $S_i$ lies between the two points of intersection $T_i$ and $U_i$ between the second cutting path and the second offset curve to determined whether said second point of intersection lies inside the second offset curve;

moving the tool, without the tool performing cutting, to that point of intersection $U_i$ of two points of intersection $T_i$ and $U_i$ between the second offset curve and the second cutting path which does not lie inside the first offset curve when a second point of intersection $S_i$ between the first offset curve and the second cutting path lies inside the second offset curve; and moving the tool, while the tool performs cutting, along the second cutting path from said point of intersection $U_i$ to a machining end point on the cutting path.

5. An area cutting method according to claim 4, further comprising the steps of:

moving the tool, without the tool performing cutting, from said first point of intersection $R_i$ to said second point of intersection $S_i$ when said second point of intersection $S_i$ does not lie inside the second offset cruve;

moving the tool, while the tool performs cutting, along the second cutting path from said second point of intersection $S_i$ to one of the points of intersection $T_i$ between said cutting path and the second offset curve; and moving the tool, without the tool performing cutting, from said point of intersection $T_i$ to the other point of intersection $U_i$ between the second cutting path and the second offset curve.

6. An area cutting method according to claim 5, further comprising the step of checking, before moving the tool, without the tool performing cutting, to that point of intersection $U_i$ of two points of intersection $T_i$ and $U_i$ between the second offset curve and the second cutting path which does not lie inside the first offset curve, whether said second point of intersection $S_i$ lies between the two points of intersection $T_i$ and $U_i$ between the second cutting path and the second offset curve to determine whether said second point of intersection lies inside the second offset curve.

7. An area cutting method for cutting an area bounded by an external shape curve and including two closed curves inside the external shape curve, comprising the steps of:

(a) producing an external offset curve;

(b) producing first and second offset curves for the two closed curves;

(c) beginning machining path processing;

(d) obtaining, after beginning machining path processing, first through sixth points of intersection between a straight line and the two offset curves and the external offset curve where the first and sixth points are for the intersection with the external offset curve, the second and third points are for the intersection with the first offset curve and the fourth and fifth points are for the intersection with the second offset curve;

(e) determining whether the two offset curves intersect along the straight line using the points of intersection;

(f) machining along the straight line between the first and second points, moving without machining between the second and third points, machining along the straight line between the third and fourth points, moving without machining between the fourth and fifth points and machining along the straight line between the fifth and sixth points when the two offset curves do not intersect along the straight line; and (g) machining along the straight line between the first and second points, moving without machining between the second and fifth points, and machining along the straight line between the fifth and sixth points when the two offset curves intersect along the straight line.

8. A method according to claim 7, wherein each of the intersection points have a coordinate value along the straight line and step d) comprises comparing the coordinate values of the third and fourth points, and if the coordinate value of the third point is less than or equal to the coordinate value of the fourth point making a determination that the two offset curves intersect along the straight line.

* * * * *